Feb. 6, 1945. L. CAMPAGNANO 2,369,016
RESILIENT TIRE AND WHEEL PROVIDED THEREWITH
Filed June 15, 1942 2 Sheets-Sheet 2

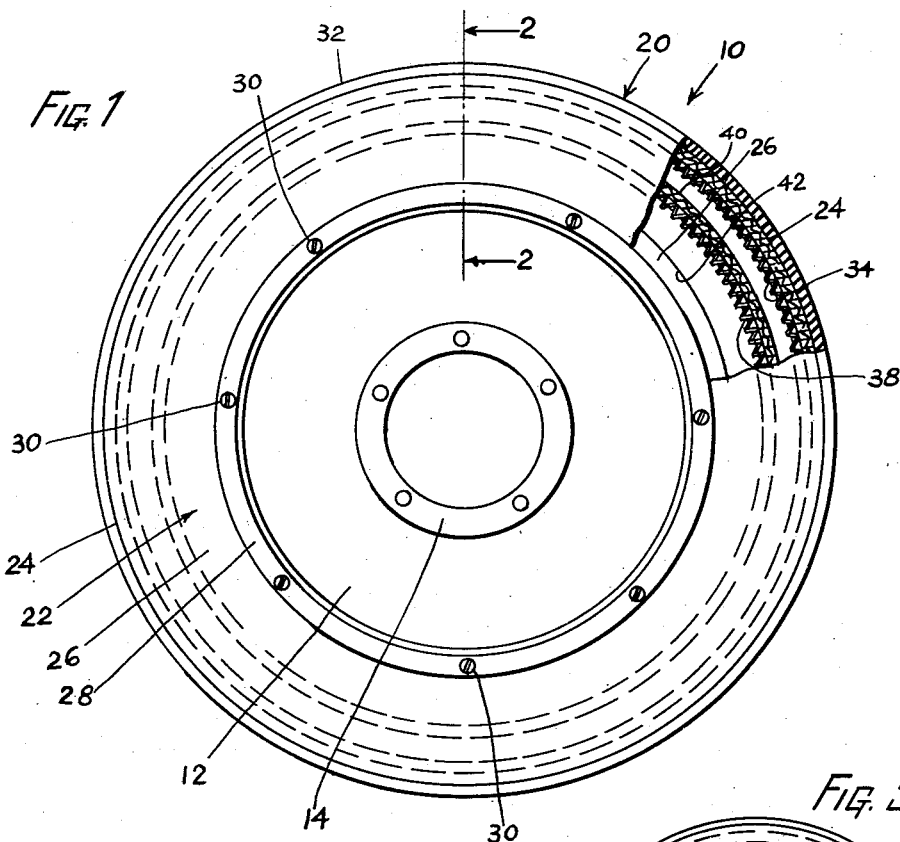
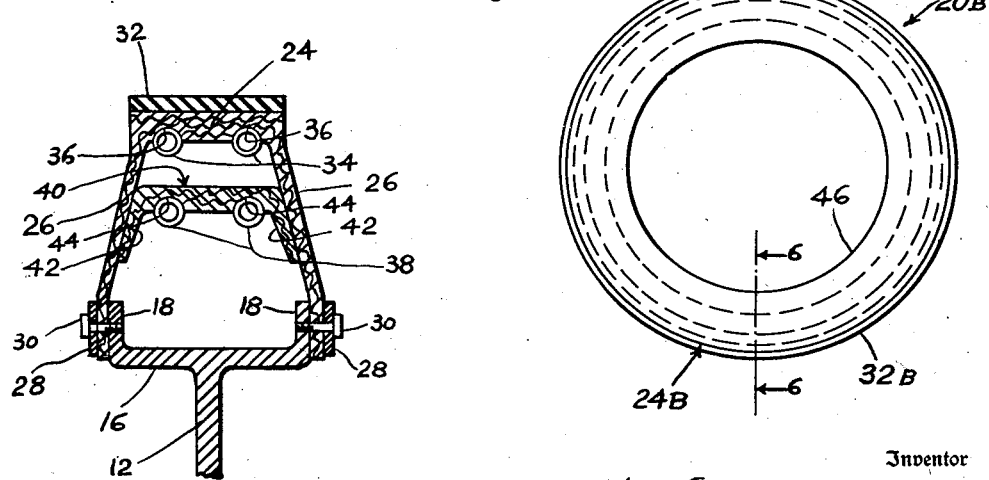

Inventor
LEO CAMPAGNANO
By Edwin Levisohn
Attorney

Patented Feb. 6, 1945

2,369,016

UNITED STATES PATENT OFFICE 2,369,016

RESILIENT TIRE AND WHEEL PROVIDED THEREWITH

Leo Campagnano, Rockaway Park, N. Y.

Application June 15, 1942, Serial No. 447,137

14 Claims. (Cl. 152—287)

This invention relates to wheels for automobiles and other vehicles and more particularly to resilient rims or tires for such wheels.

One object of the invention is to provide a resilient tire for a wheel, the resiliency being provided without requiring the use of rubber or compressed-air tubes. More particularly, in accordance with the present invention the resilient tire comprises a flexible and inextensible casing extending peripherally of the wheel and held resiliently in distended condition completely therearound by one or more coiled springs disposed in circular formation and mounted within said casing, the arrangement being such that said coiled spring or springs, are subjected to compression and yield sufficiently with compression of the coils thereof to provide together with said casing a yieldable cushion similar to that provided by conventional pneumatic tires.

The invention will be more fully understood from the following description considered with reference to the accompanying illustrative drawings.

In the drawings:

Fig. 1 is a side view of a wheel provided with a resilient tire embodying the present invention, part of said tire being cut away for the purpose of illustration;

Fig. 2 is a sectional view on the line 2—2 of Fig. 1;

Fig. 5 is a view similar to Fig. 3, but on a smaller scale, of another form of the invention;

Figure 3:
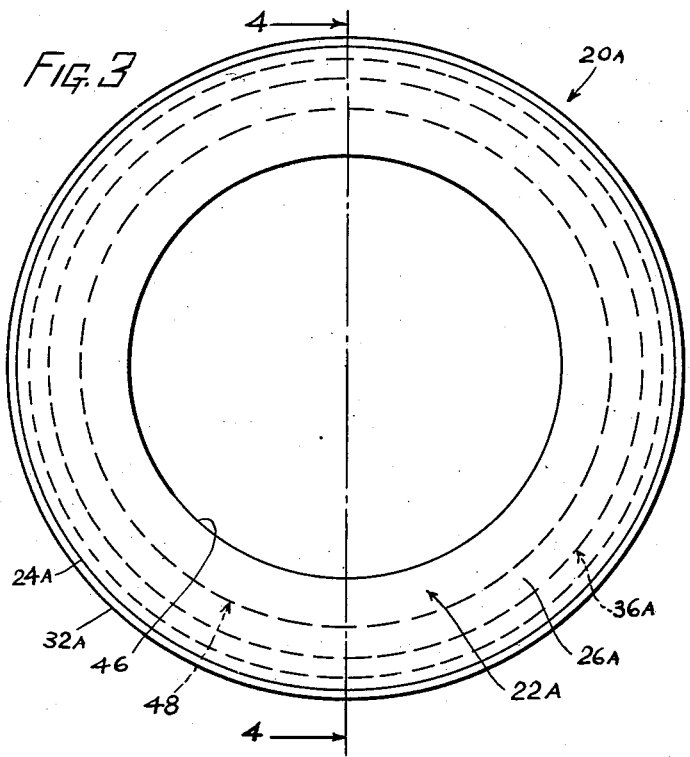
Fig. 3 is a side view of a resilient tire embodying the present invention.

Referring now to the drawings in detail, and first to the form of the invention illustrated in Figs. 1 and 2, the resilient wheel 10 embodying the present invention comprises, as here shown, a rigid metal disk 12 provided with a circular hub 14 and a peripheral rim 16 having radially extending peripheral flanges 18. The resilient tire 20 constructed in accordance with the present invention is attached to the rim 16 of the wheel.

Said tire 20 comprises a casing 22 formed of any suitable and strong fabric which is flexible, compressible and inextensible. Said fabric may consist of cloth composed entirely of textile threads or of textile threads reinforced by metallic threads which may be interwoven with said textile threads. Said fabric is preferably waterproof. Said fabric casing 22 is provided with a circular wall or rim 24 having fixed thereto, or in integral relation therewith, opposed side walls 26 which are peripherally continuous and are removably secured to the flanges 18 of the wheel by metal rings 28 and bolts or screws 30. It will be understood that the wheel can be of any suitable construction; it can be a spoked wheel or a disk wheel or any other type of wheel and that the present invention is not concerned with the wheel itself except so far as the provision of the wheel with a resilient rim or tire is involved. As the rigid rim 16 of the wheel is wider than the flexible rim 24 of the casing, the side walls 26 of the casing extend radially in diverging relation, as shown in Fig. 2, from the opposite ends, respectively, of rim 24 to the opposite ends or flanges 18, respectively, of rim 16. A tread member 32 is fixed to the rim 24 of casing 22. Said tread member can be formed of rubber and can be vulcanized to rim 24, it being understood, however, that tread member 32 need not be formed of rubber but can be formed of some other material such as fabric and can be reinforced by metallic threads interwoven with the textile threads of said fabric. It will be understood that tread member 32 is sufficiently flexible to permit yieldability of the tire as a whole to provide the desired cushion effect of the tire.

Springs 34 are disposed within casing 22 in laterally spaced relation and hold said casing resiliently in distended condition radially of the wheel completely therearound. Each spring 34 is a helically coiled spring and is of circular formation. Each of said springs extend circumferentially of the tire and has a uniform helically curved formation in which the successive coils of the spring are of arcuate contour continuously around the axis of the helix, the pitch of the helix being such that the coiled portions are uniformly spaced from each other successively along the length of the spring circumferentially of the tire. Said springs 34 are received within companion peripherally extending grooves 36 formed in the inner surfaces of rim 24 of the casing. Said springs closely abut the inner surface of rim 24, in said grooves 36, completely around the wheel and yieldingly resist movement of rim 24 radially toward rim 16. The coils of said springs are compressed when the wheel is subjected to shock, the degree of compression being proportioned to the force of the shock, and in the region of the application of the shock to the wheel the adjacent peripherally extending portions of said springs are moved toward the vehicle axle and the springs are compressed therearound until the force of compression is substantially equal to the force which causes the deformation of said springs. The diameter of the coils of springs 36 is relatively small in comparison with radial extent of the casing 22 and said springs are spaced a substantial distance radially outwardly from rigid rim 16 and from the inner ends of side walls 26 of the casing, whereby to permit inward radial movement of said springs a substantial distance in response to forces applied to the rim of the tire. It will be understood, of course, that by the yieldable resistance of springs 36 to the inward movement of rim 24 of the tire, said tire provides a cushion substantially in the same way as in a pneumatic tire without, however, requiring the action of compressed air.

As here shown, the tire 20 is provided with an additional cushion device including an additional set of springs laterally spaced from each other, said springs being indicated at 38 and being of the same character as springs 34. Said springs 38 bear against a peripherally extending transverse member 40 having peripherally continuous side portions 42 secured to the inner surfaces of the adjacent side walls 26 of casing 22. Said member 40 is preferably formed of strong fabric and is characterized by its flexibility and its inelasticity and inextensibility. Said springs are positioned in peripherally extending grooves 44 provided in member 40 completely therearound. Member 40 and the additional springs 38 function in the same way as rim 24 and springs 36 when the load on the wheel is sufficiently high to force rim 24 and springs 36 inwardly into engagement with member 40 or when the shock on the wheel similarly results in the movement of rim 24 and springs 36 inwardly against member 40. It will be understood that member 40 and the additional springs 38 may be omitted when springs 36 are sufficiently strong to meet the usual load and road conditions. On the other hand, by reason of the provision of the additional set of springs, springs 36 can be lighter than would otherwise be reqired whereby to increase the resiliency of the wheel under normal load and road conditions.

Figure 4:
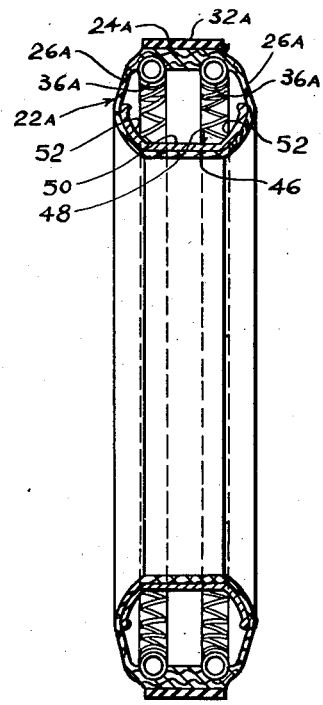
Fig. 4 is a sectional view on the line 4—4 of Fig. 3.

In the form of the invention illustrated in Figs. 3 and 4, the resilient tire 20a embodies the same principle as the tire 20 illustrated in Fig. 1. However, tire 20a embodying the present invention is constructed as a unitary article adapted to be attached to and removed from a companion wheel as a unit. The casing 22a is substantially the same as casing 20 and like the latter is provided with a rim 24a and with opposed side walls 26a, but in this case said side walls are in fixed relation to an inner rim portion 46 which is secured to a peripheral continuous rigid metal ring 48. Said metal ring 48 has a flat rim 50 and opposed outwardly flaring circular flanges 52 which hold side walls 26a of casing 22a in diverging relation from the opposite ends, respectively, of rim 24a of said casing. The tread member 32a and the springs 36a correspond to the tread 32 and springs 34 of the tire illustrated in Figs. 1 and 2. It will be understood that the action of springs 36a is the same as the action of springs 34 and that tire 20a as a whole, when attached to the vehicle wheel functions in the same way as tire 20. Further, it will be understood that if desired tire 20a may be provided with an additional set of springs disposed within casing 22a in the same way as member 40 and springs 38 of tire 20. The wheel on which tire 20a is to be mounted can be of any suitable construction having a demountable rim to permit tire 20a to be put on and taken off the wheel.

Figure 6:
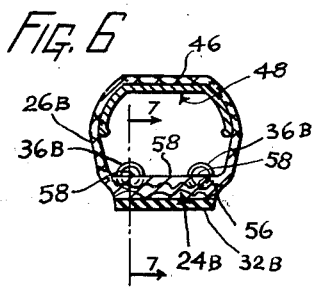
Fig. 6 is a sectional view on the line 6—6 of Fig. 5.
Figure 7:
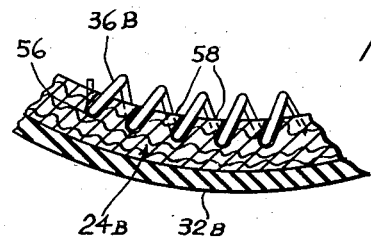
Fig. 7 is a sectional view on the line 7—7 of Fig. 6, the spring being shown in elevation.
Figure 8:
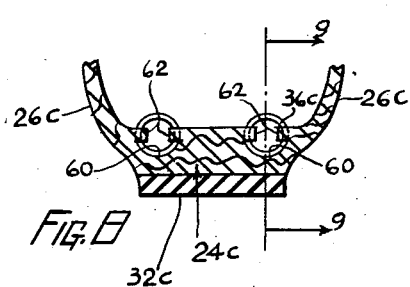
Fig. 8 is a fragmentary sectional view similar to Fig. 6, showing a modification.
Figure 9:
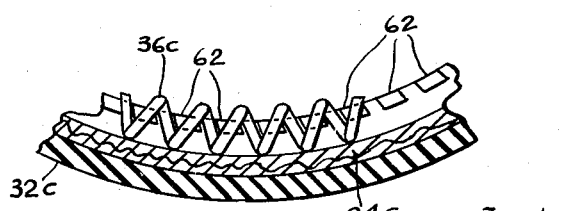
Fig. 9 is a sectional view on the line 9—9 of Fig. 8.

In the form of the invention illustrated in Figs. 5 to 7, the tire 20b is similar to tire 20a, but in this form of the invention the springs 36b engage rim 24b in companion helical grooves 56, fitting therein, the transverse portions 58 of said rim extending between the adjacent coils of said springs, respectively, so that said springs are engaged in said rim for approximately half of the coil at the outer part of the spring. By reason of this construction, lighter springs can be used than in the previously described forms of the invention, while at the same time the desired degree of stiffness of the tire as a whole is provided. The material of rim 24b, like the material of rims 24 and 24a, is compressible but inextensible so that the coils of the spring can be compressed under load. Also, in this form of the invention, excessive differences in the original length between the springs 26b and the rim 24b are avoided and the tire is reinforced against lateral displacement due to the action of centrifugal force when the vehicle is making a turn. Substantially the same results are accomplished by the construction illustrated in Figs. 8 and 9. In this case, the grooves 60 in rim 24c, which in other respects is similar to rim 24b, are non-helical, being in this respect similar to grooves 36 but deeper than the latter, but lugs 62, which are preferably compressible are provided on the opposite side walls of grooves 60 and project into the spaces between adjacent coils of the coiled springs 36c which correspond to the springs 36b. The tread members are indicated at 32b and 32c in Figs. 6 and 8, respectively, and correspond to tread 32.

In each of the forms of the invention, the springs which are located nearer the outer side of the tire or wheel are preferably stronger than the springs located nearer the inner side of the tire or wheel in order to exert greater resistance to compression under the action of centrifugal force when the vehicle makes a turn. It will be understood that by the outer side of the tire or wheel is meant the side or vertical wall farther from the longitudinal median line of the chassis of the vehicle than the opposite vertical wall of the tire when the tires are mounted on their respective wheels, said opposite vertical wall being in that case the inner side of the tire. Also, in each form of the invention, the spring preferably has an initial circumferential length greater than the circumference of the surface of the rim which the spring engages when in position in the casing whereby said spring is partially under compression even in the no-load condition of the tire, thus enabling the use of lighter springs for the same load conditions which would require a stronger spring if the latter were not initially compressed.

While I have shown and described the preferred embodiment of my invention, it will be understood that the latter may be embodied otherwise than as herein shown or described and also it will be understood that the principle of the present invention may be applied to wheels of bicycles, velocipedes, etc., and that in the case of tires having a narrow rim, for example, like the narrow rim of a bicycle tire, one spring may be used instead of the laterally spaced springs 36, and it will be understood further that in the case of the tires 20 and 20a, the invention is not limited to a plurality of springs but comprehends within the scope thereof the use of a single coiled spring. Accordingly, as the invention is susceptible of these and other variations, I do not wish to be limited to the constructions shown or described, or to any of them, except as may be required by the scope of the appended claims.

Having thus described my invention, what I claim and desire to secure by Letters Patent is:

1. A resilient tire comprising a flexible peripheral casing having a rim and opposed side walls, and a coil spring of circular formation disposed within said casing and engaging said rim at the inner peripheral surface of said rim, said spring being positioned in spaced relation radially outwardly from the inner ends of said side walls and movable radially inwardly with compression of the coils thereof in response to a force applied to the external peripheral rim of the tire, a peripherally continuous transverse member connected at its opposite ends to the adjacent side walls, respectively, of said casing, said member being flexible and positioned radially inwardly of said spring, and a coil spring of circular formation engaging the inner surface of said transverse member and movable radially inwardly with compression of the coils thereof in response to a force applied to the outer surface of said transverse member.

2. A resilient tire comprising a flexible peripheral casing having a rim and opposed side walls, and a plurality of coil springs disposed within said casing laterally of each other and engaging said rim at the inner peripheral surface of said rim, each of said springs extending circumferentially of the tire and having a uniform helically curved formation in which the successive coils of the spring are of arcuate contour continuously around the axis of the helix, the pitch of the helix being such that the coiled portions are uniformly spaced from each other successively along the length of the spring circumferentially of the tire, each of said springs being compressible circumferentially of the tire, said springs being spaced radially outwardly from the inner ends of said side walls and individually movable radially inwardly with compression of the coils thereof, respectively, circumferentially of the tire in response to a force applied to the external peripheral rim of the tire, said casing having an empty space adjacent the inner peripheral edges of said springs to permit said inward radial movement of said springs.

3. A resilient tire comprising a flexible peripheral casing having a rim and opposed side walls, and a plurality of coil springs disposed within said casing laterally of each other and engaging said rim at the inner peripheral surface of said rim, said springs being spaced radially outwardly from the inner ends of said side walls and movable radially inwardly with compression of the coils thereof in response to a force applied to the external peripheral rim of the tire, a peripherally continuous transverse member connected at its opposite ends to the adjacent side walls, respectively, of said casing, said member being flexible and positioned radially inwardly, of said spring, and a plurality of coil springs disposed within said casing laterally of each other, said last mentioned coil springs being of circular formation engaging the inner surface of said transverse member and movable radially inwardly with compression of the coils thereof in response to a force applied to the outer surface of said transverse member.

4. A resilient tire comprising a flexible peripheral casing having a rim and opposed laterally spaced flexible side walls extending radially inwardly from the opposite ends, respectively, of said rim and adapted to be secured to the periphery of a wheel, and a coil spring of circular formation disposed within said casing and engaging the inner peripheral surface of said rim, each of said springs extending circumferentially of the tire and having a uniform helically curved formation in which the successive coils of the spring are of arcuate contour continuously around the axis of the helix, the pitch of the helix being such that the coiled portions are uniformly spaced from each other successively along the length of the spring circumferentially of the tire, and thereby holding said side walls resiliently in distended condition radially of the tire, the diameter of the coils of said spring being substantially less than the radial extent of said side walls and said spring being compressible circumferentially of the tire whereby said spring is movable radially inwardly with compression of the coils thereof circumferentially of the tire in response to a force applied to the external peripheral rim of the tire, said casing having an empty space adjacent the inner peripheral edge of said spring to permit said inward radial movement of said spring.

5. A resilient tire comprising a member having a rigid peripheral rim, a flexible casing having a peripheral flexible rim spaced radially outwardly from said rigid rim and opposed flexible side walls extending radially between said rims, and a coil spring of circular formation disposed within said casing and engaging the inner peripheral surface of said flexible rim and thereby holding said side walls resiliently in distended condition radially of the tire, the diameter of said spring being compressible circumferentially of the tire and the coils of said spring being substantially less than the radial extent of said side walls whereby said spring is movable radially inwardly with compression of the coils thereof circumferentially of the tire in response to a force applied to the external peripheral rim of the tire, said casing having an empty space adjacent the inner peripheral edge of said spring to permit said inward radial movement of said spring.

6. A wheel having a rigid rim and a resilient tire mounted on said rim, said tire comprising a casing having a flexible rim and opposed spaced side walls extending from the opposite ends, respectively, of said flexible rim and connected removably to the opposite ends, respectively, of said rigid rim of the wheel, said rim of the casing being narrower than said rim of the wheel and said side walls extending in diverging relation from said casing-rim to said wheel-rim, and a coil spring of circular formation disposed within said casing with the coils of said spring engaging the inner peripheral surface of said flexible rim, each of said springs extending circumferentially of the tire and having a uniform helically curved formation in which the successive coils of the spring are of arcuate contour continuously around the axis of the helix, the pitch of the helix being such that the coiled portions are uniformly spaced from each other successively along the length of the spring circumferentially of the tire, said spring being compressible circumferentially of the tire and the diameter of the coils of said spring being substantially less than the radial extent of said side walls whereby said spring is movable radially inwardly with compression of the coils thereof in response to a force applied to the external peripheral rim of the tire, said casing having an empty space adjacent the inner peripheral edge of said spring to permit said inward radial movement of said spring.

7. A resilient tire comprising an inner rigid circular rim, a flexible casing connected to said rim, said casing having a flexible rim spaced radially outwardly from said rigid rim, opposed flexible side walls fixed to said flexible rim and extending radially inwardly from the opposite ends, respectively, of said flexible rim, said casing having peripherally extending portions engaging said rigid rim, and a coil spring of circular formation disposed within said casing with the coils of said spring engaging the inner peripheral surface of said flexible rim, each of said springs extending circumferentially of the tire and having a uniform helically curved formation in which the successive coils of the spring are of arcuate contour continuously around the axis of the helix, the pitch of the helix being such that the coiled portions are uniformly spaced from each other successively along the length of the spring circumferentially of the tire, said spring being compressible circumferentially of the tire and the diameter of the coils of said spring being substantially less than the radial extent of said side walls whereby said spring is movable radially inwardly with compression of the coils thereof in response to a force applied to the external peripheral rim of the tire, said casing having an empty space adjacent the inner peripheral edge of said spring to permit said inward radial movement of said spring.

8. A resilient tire comprising a flexible peripheral casing having a rim and opposed side walls, and a coil spring of circular formation disposed within said casing and engaging said rim at the inner peripheral surface of said rim, said spring being positioned in spaced relation radially outwardly from the inner ends of said side walls and movable radially inwardly with compression of the coils thereof in response to a force applied to the external peripheral rim of the tire, and means extending between the coils of said spring for limiting the compression thereof.

9. A resilient tire comprising a flexible peripheral casing having a rim and opposed side walls, and a plurality of coil springs disposed within said casing laterally of each other and engaging said rim at the inner peripheral surface of said rim, said springs being spaced radially outwardly from the inner ends of said side walls and movable radially inwardly with compression of the coils thereof in response to a force applied to the external peripheral rim of the tire, the spring which is nearer the outer side of the tire being more resistant to compression than the spring which is nearer to the inner side of the tire.

10. A resilient tire comprising a flexible peripheral casing having a rim and opposed side walls, and a coil spring of circular formation disposed within said casing and engaging said rim at the inner peripheral surface of said rim, said spring being positioned in spaced relation radially outwardly from the inner ends of said side walls and movable radially inwardly with compression of the coils thereof in response to a force applied to the external peripheral rim of the tire, said rim having portions extending between the coils of said spring for limiting the compression thereof.

11. A resilient tire comprising a flexible peripheral casing having a rim and opposed side walls, and a coil spring of circular formation disposed within said casing and engaging said rim at the inner peripheral surface of said rim, said spring being positioned in spaced relation radially outwardly from the inner ends of said side walls and movable radially inwardly with compression of the coils thereof in response to a force applied to the external peripheral rim of the tire, said rim having a helical groove and said spring having portions of its coils engaging said rim in said groove.

12. A resilient tire comprising a flexible peripheral casing having a rim and opposed side walls, and a coil spring of circular formation disposed within said casing and engaging said rim at the inner peripheral surface of said rim, said spring being positioned in spaced relation radially outwardly from the inner ends of said side walls and movable radially inwardly with compression of the coils thereof in response to a force applied to the external peripheral rim of the tire, said rim being compressible and having a peripheral groove in which said spring is seated, and projections integral with the opposite side walls of said groove extending between the coils of said spring.

13. A resilient tire comprising a flexible peripheral casing having a rim and opposed side walls, and a plurality of coil springs disposed within said casing laterally of each other and engaging said rim at the inner peripheral surface of said rim, said springs being spaced radially outwardly from the inner ends of said side walls and movable radially inwardly with compression of the coils thereof in response to a force applied to the external peripheral rim of the tire, and means extending between the coils of said spring for limiting the compression thereof.

14. A resilient tire comprising a flexible peripheral casing having a rim and opposed side walls, and a coil spring of circular formation disposed within said casing and engaging said rim at the inner peripheral surface of said rim, each of said springs extending circumferentially of the tire and having a uniform helically curved formation in which the successive coils of the spring are of arcuate contour continuously around the axis of the helix, the pitch of the helix being such that the coiled portions are uniformly spaced from each other successively along the length of the spring circumferentially of the tire, said spring being compressible circumferentially of the tire and being positioned in spaced relation radially outwardly from the inner ends of said side walls and movable radially inwardly with compression of the coils thereof circumferentially of the tire in response to a force applied to the external peripheral rim of the tire, said casing having an empty space adjacent the inner peripheral edge of said spring to permit said inward radial movement of said spring, said spring being under partial compression circumferentially of the tire in the no-load condition of the tire.

LEO CAMPAGNANO.